United States Patent Office 3,093,508
Patented June 11, 1963

3,093,508
METHOD OF COATING GLASS
Erwin W. Wartenberg, Gaehkopf 20, Stuttgart, Germany
No Drawing. Filed June 2, 1960, Ser. No. 33,591
Claims priority, application France June 8, 1959
13 Claims. (Cl. 117—211)

The present invention relates to a method of coating glass, more particularly, the present invention is concerned with forming a thin, transparent and even coating on a glass body such as an automobile windshield or the like. In such cases, the glass body on which the transparent coating is to be formed must be pretensioned so that the chemophsyical properties of the glass surface are changed without impairing the transparency of the glass body. Transparent coatings such as may be applied in accordance with the present invention and which are electrically conductive are frequently utilized for heating or defrosting of airplane or automobile windshields.

Coatings of this type have been applied to pretensioned glass planes by defatting the glass thereafter heating the glass plane in an electric furnace close to its softening point and spraying onto the heated glass a solution which, for instance, may consist of tin chloride, phenylhydrazine and methanol. Thereafter, the glass pane is pretensioned in a relatively cool air stream. Thus, the abovedescribed process comprises three separate procedures, namely the defatting, the application of the coating by spraying, and the subsequent pretensioning of the glass in an air stream.

However, this conventional method does not give the most desirable results. Apart from the fact that the multi-stage process described above requires considerable labor, it is very difficult to produce in this manner a glass body which will possess the desired high optical and mechanical qualities. This is due to the fact that the glass surface is unevenly cooled by contact with the individual droplets of the sprayed solution, and this impairs the optical qualities as well as the mechanical strength of the glass since due to the uneven cooling during spraying uncontrollable stress areas are formed in the glass which will remain fixed due to the pick air cooling which follows. Furthermore, the time interval between heating of the glass and removal of the same from the furnace, and the air quenching of the same is relatively long and during this intervening period uneven and uncontrollable cooling takes place. Thus, the glass quality is reduced by the above-described process and furthermore, it is not possible to form in the abovedescribed manner a coating of even thickness. The unevenness of the coating layer manifests itself as an iridescent effect at the coated glass surface.

It is therefore an object of the present invention, to provide a method of forming thin coatings on glass bodies which will overcome the above-discussed difficulties and disadvantages.

It is another object of the present invention to provide a method for forming even thin and transparent coatings on glass bodies, which can be carried out in a simple and economical manner.

It is still another object of the present invention to provide a method for simultaneously coating and quenching a glass body such as a windshield pane or the like.

Other objects and advantages of the present invention will become apparent from a further reading of the description and of the appended claims.

With the above and other objects in view, the present invention comprises a method of forming a firmly adhering surface coating on a glass body, comprising the steps of forming a liquid bath having a predetermined boiling point and containing at least one coating substance adapted to chemically react and firmly adhere to a glass body at coating temperature being higher than the predetermined boiling point, maintaining the liquid bath at a temperature at the boiling point thereof, and immersing into the liquid bath containing the coating substance a glass body heated to the coating temperature so as to vaporize the liquid bath along the immersed surface of the heated glass body, forming along the surface a vaporized region consisting of vaporized liquid of the bath having the coating substance distributed therethrough and being heated to the coating temperature, thereby causing the substance to react with and firmly adhere to the glass body forming a coating thereon.

A preferred manner of carrying out the present invention comprises the steps of heating a glass body to an elevated pre-quenching temperature of about 600° C. being sufficiently high to permit quenching of the glass body by quick cooling of the same, and immersing the thus-heated glass body into monochloro benzene as a quenching liquid so as to cause quenching of the heated glass body by immersion of the same into the liquid, the liquid containing dissolved therein tin tetrachloride as a substance adapted to chemically react and firmly adhere to the glass body at an elevated temperature being within the range defined by the pre-quenching temperature and the boiling temperature of the monochloro benzene, whereby the portion of the liquid adjacent to the immersed heated glass body will be vaporized, forming in contact with the glass body a vaporized region consisting of the vaporized liquid and the substance distributed therethrough and having a temperature within the range so that the substance of the vaporized region will react with and firmly adhere to the glass body forming a surface coating thereon.

Thus, according to the present invention, the disadvantages of the prior art methods are overcome by dissolving the coating-forming substance in the quenching liquid. The quenching liquid is then preferably maintained at a temperature close to its boiling point so that upon immersion of the much hotter glass body the portion of the liquid in the vicinity of the glass body will be quickly vaporized. Thereby it is achieved the immersed glass body will be surrounded by vapors of the quenching liquid containing in fine and even distribution the coating-forming substance. It follows that the coating-forming substance will contact the glass surface which will still possess a temperature considerably higher than the boiling point of the liquid, so that a firm bond will be established between the coating-forming substance and the glass surface. The temperature to which the glass is first heated, the temperature of the quenching liquid as well as the specific quenching liquid will be so chosen that contact between the coating-forming substance and the glass surface is established at a temperature which is sufficiently high to cause forming of a firm bond, preferably by chemical reaction between the coating-forming substance and the glass surface.

It is essential according to the present invention that the coating-forming substance is dissolved in the quenching liquid. Consequently, as quenching liquid a liquid has to be used in which the coating-forming substance is soluble. While the quenching per se may be carried out in more of less conventional manner, it is furthermore essential according to the present invention that the boiling point of the quenching liquid is considered as well as the temperature of the hot glass which is to be immersed and the temperature of the quenching liquid so that the temperature at which the coating-forming substance dispersed in the quenching liquid vapors contacts the glass will be sufficiently high to cause formation of a firm and preferably chemical bond between glass and coating.

It has been found that good results are obtained by using as coating-forming substances water-free metal halides particularly those which possess homeopolar characteristics in forming a bond with the glass. Tin tetrachloride is one of the compounds which may be advantageously used.

However, depending on the specific conditions and requirements, the coating may be formed of many other substances such as silanes, for instance phenyltrichloro silane or metallo-organic compounds such as zinc ethyl. In connection with the above-mentioned coating-forming substances, good results were obtained with monochloro benzene as the quenching liquid, however, other solvents such as carbon tetrachloride or amyl alcohol may also be used advantageously. The thickness of the coating can be controlled by suitably adjusting the concentration of the coating-forming substance in the quenching bath.

When it is desired to give to the coating a certain degree of electric conductivity, phosphorous trichloride or phosphorous oxychloride may be additionally dissolved in the quenching liquid. It appears that these additions increase the number of faults in the lattice structure.

Experimental exploration of the above-described method indicates that in the quenching bath a gas or vapor sleeve is formed surrounding the immersed glass body. This vapor layer in contact with the glass body will collapse after a limited period of time which will vary with the specific conditions of the process but in the average will last for about one minute. The pretensioning of the glass is completed with the collapse of the vapor layer. Within the vapor layer, simultaneously with the pretensioning of the glass, also a steaming of the coating substance onto the glass surface will take place with concurrent chemical reaction between the coating substance and the glass surface, in such a manner that along the entire surface of the immersed glass body a substantially even distribution of coating substance will be achieved such as up to now could be achieved only with the much more complicated and expensive vacuum deposition methods.

The present method could be loosely described as a vapor deposition method which is carried out at atmospheric pressure, since the heat radiation from the hot immersed glass body will vaporize the surrounding quenching liquid without at first allowing contact between the quenching liquid and the glass body. Such contact is prevented by the immediately formed interposed layer of vaporized quenching liquid.

In a true solution, the dissolved substance is evenly distributed in the solvent and thus there will also be an even distribution of the coating-forming substance in the vapor layer surrounding the glass body. Consequently, the thickness of the coating formed of the molecules of coating-forming substance distributed in the vapor layer and reacting with the glass body will be of high uniformity.

Good results are obtained with metal halides and oxyhalides, preferably halides and oxyhalides of the fourth and fifth group of the periodic system since these metals due to their position in the periodic system are neither specifically electropositive nor electronegative and are easily soluble in the organic quenching liquids.

As quenching liquids which will be capable to dissolve the coating substances, liquid organic substances with suitable boiling points may be used advantageously, such as $CCl_4$, $C_2Cl_4$, $C_6H_4Cl_2$, $C_6H_5Cl$, $C_6H_6$, $C_5H_{11}OH$. If an inflammable quenching liquid is used such as $C_6H_6$ or $C_5H_{11}OH$, it is of course necessary to work in a protective gas atmosphere, for instance, under carbon dioxide or nitrogen.

For coating substances which form predominantly homeopolar bonds, such as the halides of the third, fourth or fifth group of the periodic system, for instance $BBr_3$, $AlBr_3$, $SnCl_4$, $POCl_3$, organic quenching liquids which are free of OH groups should be used as solvents. In combination with coating substances which will form a heteropolar bond, for instance $CdCl_2$, OH groups containing liquids such amyl alcohol may be used.

The method of the present invention is applicable to glass bodies of any desired composition such as sodium-calcium-silicon glass or boron-silicon glass or optical glasses.

The chemical reactions which take place between the coating substance which has been dissolved in the quenching bath, and the surface of the hot glass body may be described by way of example in connection with applying tin tetrachloride to sodium-silicon glass. The present invention, however, is not to be considered limited to the specific details of the example or to the specific reactions assumed to take place therein.

*Example I*

A glass pane having a temperature of about 600° C. is immersed into the quenching bath. At this high temperature, a small portion of the tin tetrachloride will be disassociated in accordance with the following equation:

(I) $$SnCl_4 \rightarrow SnCl_2 + Cl_2$$

The thus-formed $SnCl_2$ will react under formation of tin and tin tetrachloride as follows:

(II) $$SnCl_2 \rightarrow Sn + SnCl_4$$

The products of this thermal reaction will now react with the glass surface which contains unsaturated bonds such as free $Si^+$ and $O^-$ valences. A further participant in the chemical reactions is the small amount of water contained in the organic solvent and also found in traces at the glass surface, which causes hydrolyzation of the tin tetrachloride, about in the manner described below:

(III)
$$SnCl_2 + H_2O \rightarrow SnO + HCl$$
$$SnCl_4 + 2H_2O \rightarrow SnO_2 + 4HCl$$
$$SnCl_4 + H_2O \rightarrow SnOCl_2 + 2HCl$$

These reactions produce the materials which form a semiconductive layer, namely, Sn, SnO, $SnO_2$, which depending on their state of oxidization will act as electron donors or acceptors and thus will cause a flow of electrons.

The products of the above-discussed chemical reactions then form an intimate contact with the glass surface.

The thickness of the coating depends on the concentration of the coating-forming substance in the quenching bath. At a concentration of 5% $SnCl_4$ in the quenching bath and a quenching time of about 60 seconds at 132° C., the thickness of the coating will be about 800 Angstroms. At a concentration of 3% and otherwise equal conditions, the thickness of the coating will be about 500 Angstroms.

It is a particular advantage of the present method that it is possible in accordance therewith to form coatings of even thickness even on poorly accessible surface portions of glass bodies, such as the inner surface of cavities and the like.

The method of the present invention will now be further described in two examples without being limited to the specific details of the examples.

*Example II*

A mirror glass pane of 300 x 300 x 8 mm. is cleaned with a soft cloth and dry pumice flour and thereafter heated for three minutes and 45 seconds in a resistance furnace maintained at a temperature of 780° C. Immediately thereafter, the glass which has been thus heated to slightly below its softening point, will be immersed in a nearly boiling solution of 3 to 5% water-free tin tetrachloride in 50 liters of carbon tetrachloride. Upon immersion of the glass pane, there forms immediately a vapor layer covering the same. The vapor layer breaks down after about 100 seconds and immediately thereafter the glass pane is removed from the bath. It is found that the entire glass surface which had been immersed is covered with an even transparent coating consisting primarily of tin oxides and having a thickness of about 800 Angstroms. When viewed at an angle the coating appears steel blue. It is completely clear without clouding. The thickness of the thus-formed coating suffices in order to accommodate the current required for the heating of the glass pane.

*Example III*

According to the present invention, it is possible to form a silicone coating for instance on windshield panes or glass insulators while simultaneously pretensioning these glass bodies. As will be described, this can now be accomplished in a single process and furthermore, rather than silicones, the easier available and more economical silanes may be used for instance a solution of phenylchloro silane in carbon tetrachloride.

A glass pane of the dimensions 300 x 300 x 8 mm. is cleaned and heated as described in Example II. The glass which has reached a temperature slightly below its softening point is then immersed in a quenching bath consisting of a boiling solution of between 3 and 5% phenyltrichloro silane in 50 liters of carbon tetrachloride. The glass pane remains in the bath until the initially formed vapor layer has collapsed. This takes about 100 seconds. Upon removal of the glass pane it is found that an even, transparent silicone coating has been formed covering the entire previously immersed surface of the glass body. The thus-treated glass pane can no longer be wetted with water.

In a similar manner metallo-organic compounds such as zinc ethyl may be applied to a glass body, whereby as quenching bath liquid for instance monochloro benzene may be used which is particularly suitable for thin glass bodies.

The electric conductivity of the layer can be controlled and increased by the additional solution in the quenching bath and thus application of substances such as phosphorus trichloride or phosphorus oxytrichloride which tend to increase the number of lattice faults.

Thus, by dissolving compounds of suitable elements in the quenching bath, it is possible to produce transparent, heat-reflecting coatings, for instance on glass panes which may find use as heat insulating windshields of safety glass, or as heat insulating safety glasses such as are used in the vicinity of metal smelters or other heat radiating installations. It is also possible according to the present invention to improve and simultaneously to harden optical lenses of all kinds including spectacle lenses.

The coating formed according to the present invention is very strongly adhered to the glass surface and it is also of greater hardness than the glass so that it is not possible to remove the coating with the abrasive or similar means which conventionally are used in the glass industry.

It is of course also possible to apply the coating according to the present invention to a portion of the surface of a glass body only, for instance to one face of a glass pane. This may be important in the case of glass bodies which are to be unilaterally heated. One-sided coating preferably is carried out by coating the portion of the surface which is to remain free of the coating according to the present invention, with a material which will adhere to the glass surface portion while the glass body is heated and subsequently immersed in the quenching bath. The coating according to the present invention will then be superposed on the thus-formed protective coating and subsequently can be removed together with the latter so that the inventive coating will remain only on the portions of the glass body which were not covered with the protective coating.

A further advantageous application of the present method is found in the production of filter discs of safety glass to be arranged in front of television tubes.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of forming a firmly adhering surface coating on a glass body while simultaneously quenching the same, comprising the steps of forming a liquid bath having a predetermined boiling point and containing at least one coating substance adapted to firmly adhere to a glass body at quenching temperature thereof and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

2. A method according to claim 1 wherein said liquid bath contains, in addition to said at least one coating substance, at least one electric conductivity controlling substance selected from the group consisting of phosphorus trichloride and phosphorus oxychloride.

3. A method of forming a firmly adhering surface coating on a glass body while simultaneously quenching the same, comprising the steps of forming a liquid bath having a predetermined boiling point and containing at least one coating substance adapted to chemically react and firmly adhere to a glass body at a quenching temperature of at least about 600° C. and at a coating temperature being higher than said predetermined boiling point and lower than said quenching temperature; maintaining said liquid bath at a temperature slightly below the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby reacting said substance with and firmly adhering the same to said glass body so as to form an even coating thereon.

4. A method of forming a firmly adhering surface coating on a glass body while simultaneously quenching the same, comprising the steps of forming a water-free liquid bath having a predetermined boiling point and containing at least one water-free metal halide as a coating substance adapted to firmly adhere to a glass body at a quenching temperature of at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

5. A method of forming a firmly adhering surface coating on a glass body while simultaneously quenching the same, comprising the steps of forming a water-free liquid bath having a predetermined boiling point and containing at least one homeopolar water-free metal halide as a coating substance adapted to firmly adhere to a glass body at a quenching temperature of at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

6. A method of forming a firmly adhering surface coating on a glass body while simultaneously quenching the same, comprising the steps of forming a liquid bath having a predetermined boiling point and containing water-free tin tetrachloride as a coating substance adapted to firmly adhere to a glass body at a quenching temperature of at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

7. A method of forming a firmly adhering surface coating on a glass body while simultaneously quenching the same, comprising the steps of forming a liquid bath having a predetermined boiling point and containing at least one silane as a coating substance adapted to firmly adhere to a glass body at a quenching temperature of at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

8. A method of forming a firmly adhering surface coating on a glass body while simultaneously quenching the same, comprising the steps of forming a liquid bath having a predetermined boiling point and containing phenyltrichloro silane as a coating substance adapted to firmly adhere to a glass body at a quenching temperature of at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

9. A method of forming a firmly adhering surface coating on a glass body while simultaneously quenching the same, comprising the steps of forming a liquid bath having a predetermined boiling point and containing at least one metallo-organic compound as a coating substance adapted to firmly adhere to a glass body at a quenching temperature of at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

10. A method of forming a firmly adhering surface coating on a glass body while simultaneously quenching the same, comprising the steps of forming a liquid bath having a predetermined boiling point and containing zinc ethyl as a coating substance adapted to firmly adhere to a glass body at a quenching temperature of at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

11. A method of forming a firmly adhering surface coating on a glass body while simultaneously quenching the same, comprising the steps of forming a liquid bath consisting essentially of monochloro benzene having a predetermined boiling point and containing at least one coating substance adapted to firmly adhere to a glass body at a quenching temperature at least about 600° C. and at a coating temperature being higher than said predetermined boiling point and lower than said quenching temperature; maintaining said liquid bath at substantially the boiling point thereof; and immersing into said liquid bath containing said coating substance a glass body heated to at least said quenching temperature so as to quench said glass body and simultaneously to vaporize the liquid bath along the immersed surface of said heated glass body thereby forming along said surface a vaporized region consisting of vaporized liquid of said bath having said coating substance distributed therethrough and being heated to at least said coating temperature, thereby firmly adhering said substance to said glass body so as to form an even coating thereon.

12. A method of forming a firmly adhering surface coating on a glass body while simultaneously quenching the same, comprising the steps of heating a glass body to a quenching temperature being sufficiently high to permit quenching of said glass body by quick cooling of the same; and immersing the thus-heated glass body into a quenching liquid being maintained at a temperature slightly below the boiling temperature thereof, said boiling temperature being lower than said pre-quenching temperature and being sufficiently low to subject said heated glass body to quenching by immersion of the same into said liquid, said liquid containing dissolved therein at least one substance adapted to chemically react and firmly adhere to said glass body at an elevated temperature being within the range defined by said quenching temperature and said boiling temperature, whereby the portion of said liquid adjacent to said immersed heated glass body will be vaporized, forming in contact with said glass body a vaporized region consisting of said vaporized liquid and said substance distributed therethrough and having a temperature within said range so that said substance of said vaporized region will react with and firmly adhere to said glass body forming a surface coating thereon.

13. A method of forming a firmly adhering surface coating on a glass body while simultaneously quenching the same, comprising the steps of heating a glass body to a quenching temperature of at least about 600° C. being sufficiently high to permit quenching of said glass body by quick cooling of the same; immersing the thus-heated glass body into liquid monochloro benzene maintained as a quenching liquid at a temperature close to its boiling point so as to cause quenching of said heated glass body by immersion of the same into said liquid, said liquid containing dissolved therein tin tetrachloride as a substance adapted to chemically react and firmly adhere to said glass body at an elevated temperature being within the range defined by said pre-quenching temperature and the boiling temperature of said monochloro benzene, whereby the portion of said liquid adjacent to said immersed heated glass body will be vaporized, forming in contact with said glass body a vaporized region consisting of said vaporized liquid and said substance distributed therethrough and having a temperature within said range so that said substance of said vaporized region will react with and firmly adhere to said glass body forming a surface coating thereon; and removing said glass body from said quenching liquid after said vaporized region has disappeared due to cooling of said vaporized liquid below the boiling point thereof.

References Cited in the file of this patent

UNITED STATES PATENTS

| | | |
|---|---|---|
| 2,630,656 | Kramer et al. | Mar. 10, 1953 |
| 2,772,190 | Haayman et al. | Nov. 27, 1956 |
| 2,791,521 | Jaffe | May 7, 1957 |

FOREIGN PATENTS

| | | |
|---|---|---|
| 732,566 | Great Britain | June 29, 1955 |

OTHER REFERENCES

"Glass Engineering Handbook" (Shand), published by McGraw-Hill (N.Y.), 1958, pages 109–111 relied on.